W. G. HOPKINS AND F. J. SULLIVAN.
BAKER'S OVEN.
APPLICATION FILED APR. 10, 1919.

1,336,782. Patented Apr. 13, 1920.
4 SHEETS—SHEET 1.

Inventor:
Walter G. Hopkins
Francis J. Sullivan
By their attorney.

UNITED STATES PATENT OFFICE.

WALTER G. HOPKINS, OF BUFFALO, NEW YORK, AND FRANCIS J. SULLIVAN, OF BOSTON, MASSACHUSETTS, ASSIGNORS TO ATLAS BREAD COMPANY, OF BOSTON, MASSACHUSETTS, A CORPORATION OF MASSACHUSETTS.

BAKER'S OVEN.

1,336,782.   Specification of Letters Patent.   Patented Apr. 13, 1920.

Application filed April 10, 1919. Serial No. 289,131.

*To all whom it may concern:*

Be it known that we, WALTER G. HOPKINS, a citizen of the United States, residing at Buffalo, in the county of Erie and State of New York, and FRANCIS J. SULLIVAN, a subject of King George V of England, residing at Boston, in the county of Suffolk and State of Massachusetts, have invented new and useful Improvements in Bakers' Ovens, of which the following is a specification.

This invention relates to improvements in bakers' ovens and in the application of the same to advertising devices.

The object of the invention is to provide a baker's oven of the rotary reel type which is constructed to provide rapid and complete circulation of heat throughout the reel so as to contact with all of the articles which are being cooked upon a rotary reel, and bake them evenly.

The invention consists in so constructing the oven and its casing and to so dispose of the aroma from the articles being cooked in said oven that it will attract the attention of passersby where said oven is located within a show window, as well as to bake said articles satisfactorily.

To these ends the casing, within which the reel is rotatably mounted, is formed to represent, both in shape and color a loaf of bread. This casing with the oven inclosed therein is placed within a show window and the aroma from the articles being cooked, such as bread, rolls and the like, is conducted through a flue which is shaped to represent a carving knife intersecting the casing as though the loaf of bread were being cut. The blade of the carving knife and the handle thereof are made hollow to form a flue and a hood is placed over the upper end of the carving knife handle which is connected by a suitable pipe to a blower which draws the air from the oven and blows it out in front of the show window. This attracts the attention of persons passing along in front of the show window. Their attention is further attracted, and this feature constitutes a part of our invention, by a device for intermittently illuminating the interior of the casing, the casing being provided with a window extending longitudinally thereof throughout the greater part of its length, so that as people are passing along the sidewalk in front of the window in which this device is located their attention is attracted by the intermittent flashing of the light to the large loaf of bread in the show window and at the same time they are further attracted by the smell of the bread cooking. Thus having had their attention attracted they look in the window in the casing representing the loaf of bread and see the loaves of bread, biscuits, rolls or the like being cooked as the reel carries them on the shelves upon which they are located past the window.

To these ends the invention further consists in the combination and arrangement of parts set forth in the following specification and particularly pointed out in the claims thereof.

Referring to the drawings.

Like numerals refer to like parts throughout the several views of the drawings.

Figure 1:
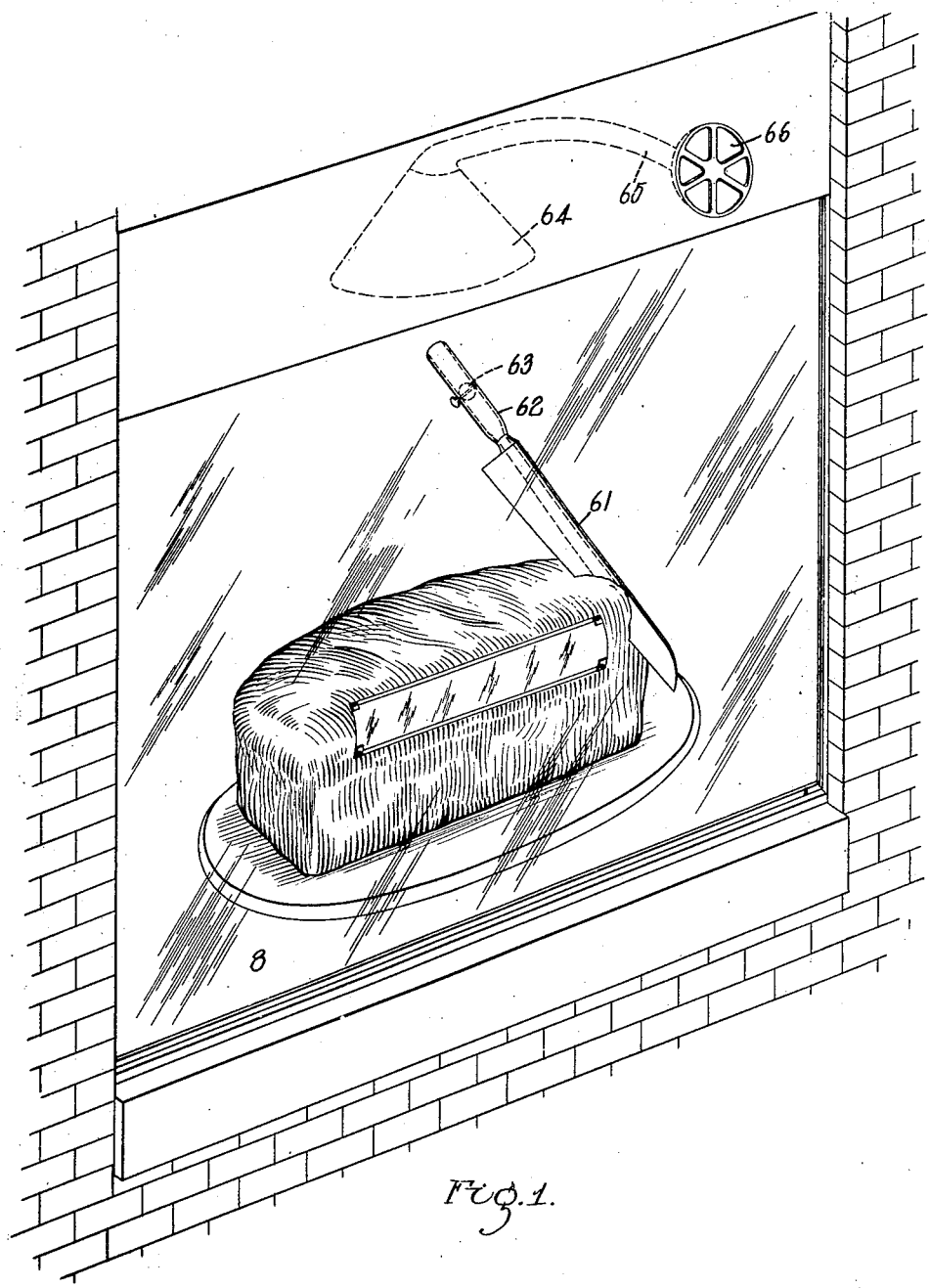
Figure 1 is a perspective view of a show window with our improved baker's oven located therein and the means for drawing air from said baker's oven and wafting it outwardly upon the sidewalk in front of said show window.
Figure 2:
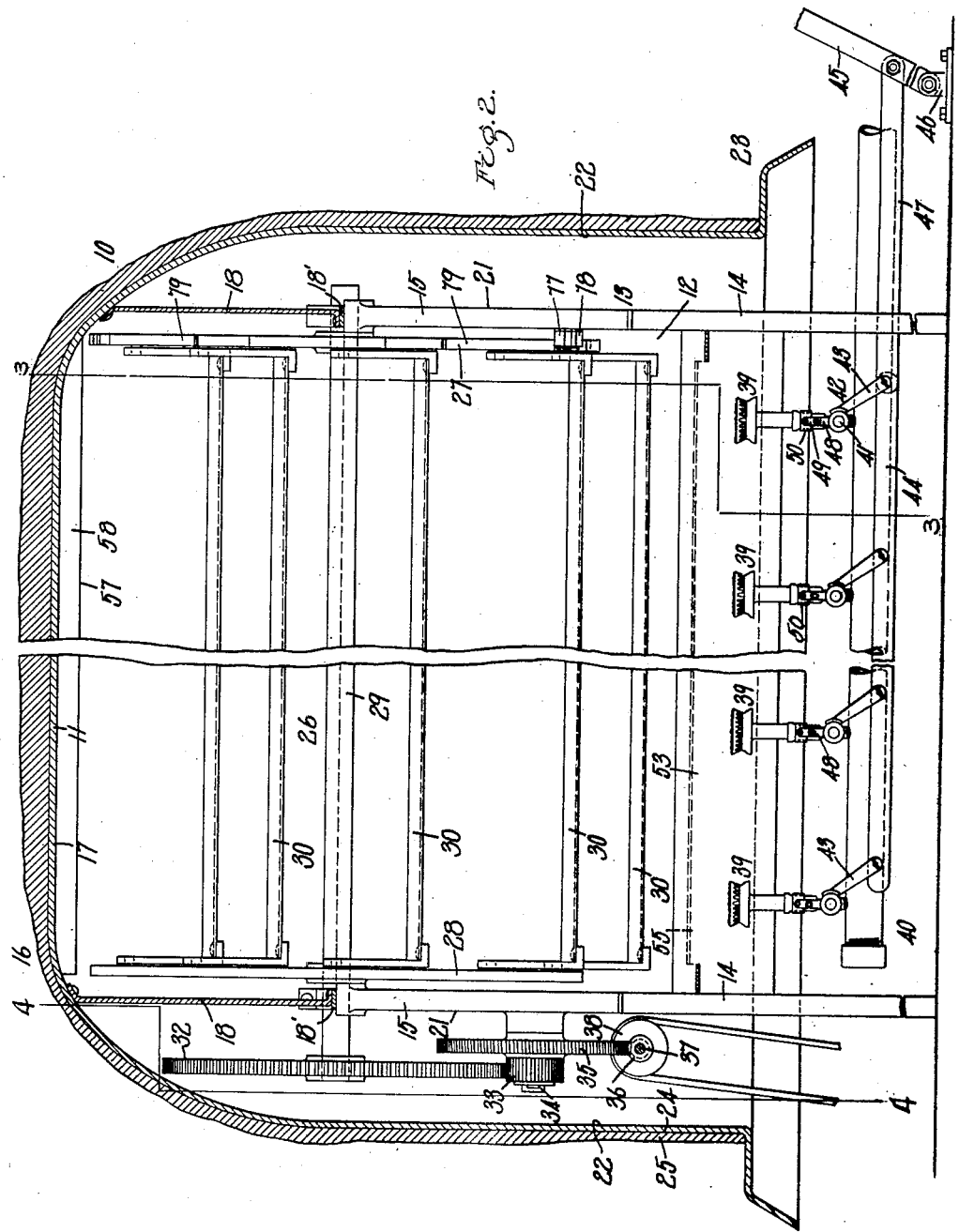
Fig. 2 is a sectional elevation of our improved baker's oven.
Figure 3:
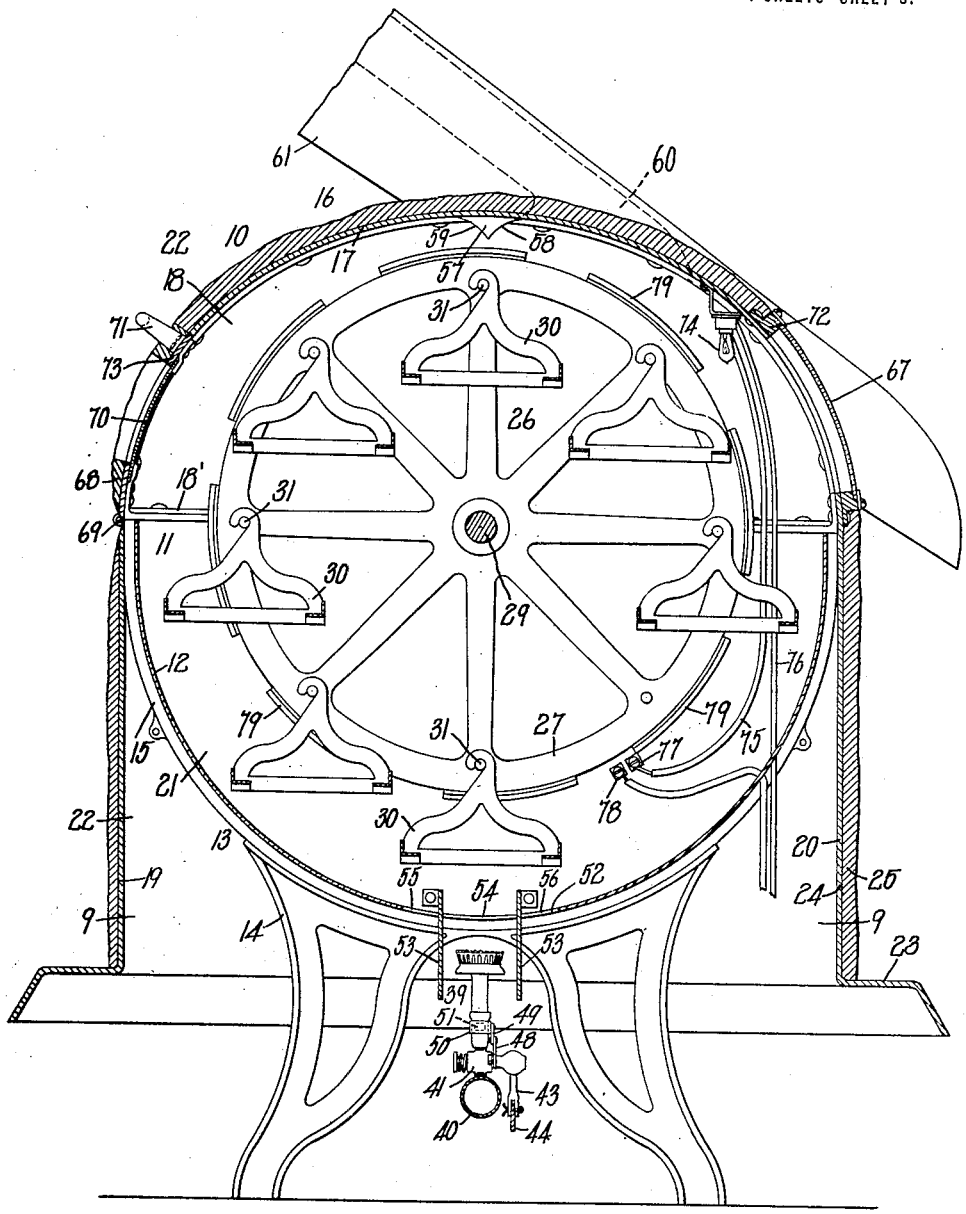
Fig. 3 is a transverse section taken on line 3—3 of Fig. 2.
Figure 4:
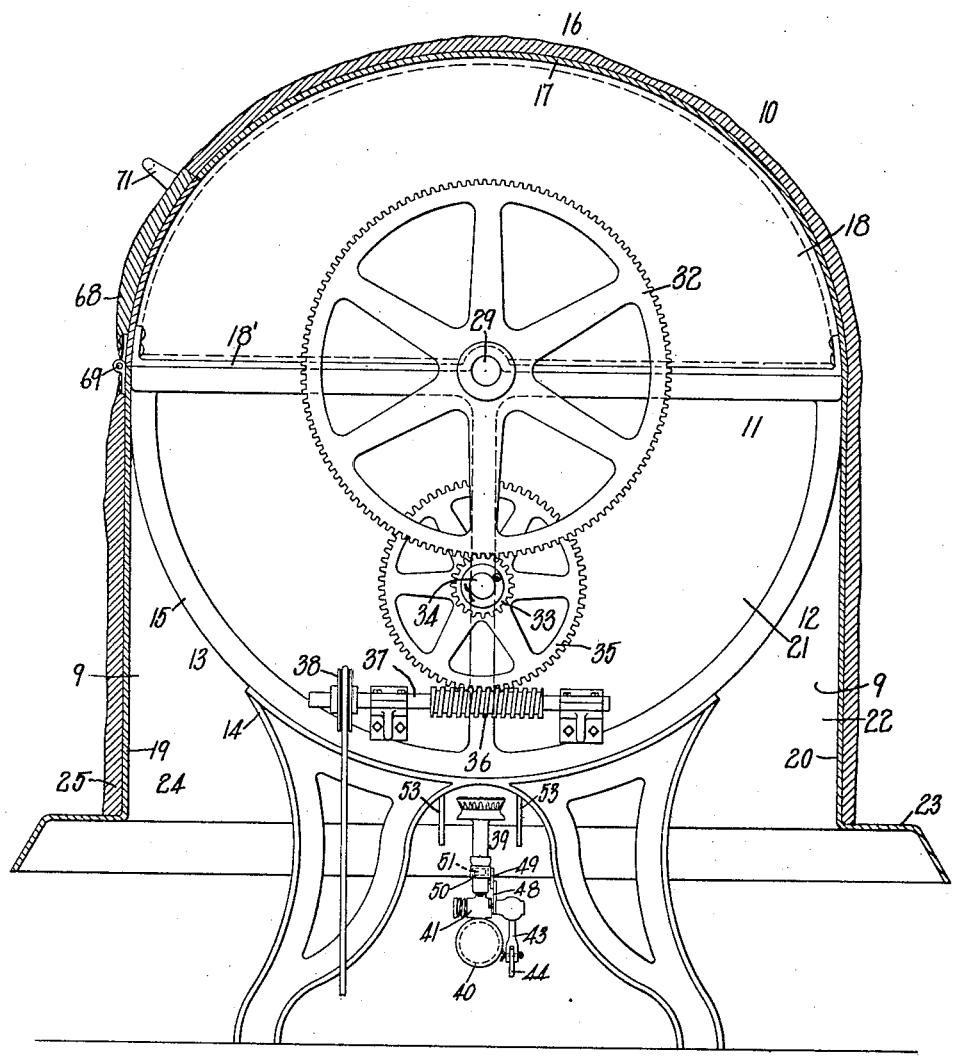
Fig. 4 is a transverse section taken on line 4—4 of Fig. 2.

In the drawings, 10 is the oven which is preferably placed in a show window 8, as illustrated in Fig. 1, said oven consisting of a casing 11 having a hollow semi-cylindrical base 12 which is supported at its opposite ends upon a frame 13 consisting of a pair of legs 14, to which are fastened semi-circular rings 15 which are connected to opposite ends of the semi-circular casing 12.

A cover 16 rests upon the frame 13. Said cover consists of a curvilinear upper portion 17 formed of metal and from the lower edge of said semi-circular portion the cover 16 extends downwardly forming substantially vertical sides 19 and 20 and both said base 12 and the cover 16 are provided with vertical end portions 21 and 22 respectively, the cover 16 terminates at the bottom thereof in a laterally extending flange 23 which is adapted to represent a bread board.

Vertical portions 18 are fastened to the cover 16 along their upper edges and at their bottom edges are fastened to strips 18' which extend along the upper edges of the end frames 13.

Chambers 9 are thus formed between the vertical sides 19 and 20 and the semi-cylindrical base 12 and form air spaces and these air spaces prevent cooling of the oven by the direct impingement upon the base thereof of currents of cold air.

The outer framework of said cover consists of a metal inner portion 24 and an outer portion 25 of stucco, plaster or the like which is colored and formed to represent bread, the upper portion of the cover being preferably of a somewhat darker shade of brown or cream color than the sides and ends.

A reel 26 consisting of two ends 27 and 28 is fastened to a shaft 29, said shaft being rotatably mounted upon the opposite ends of said frame 13. Shelves 30 are pivotally suspended at 31 upon the opposite ends of said reel. The shaft 29 is rotated by means of a gear 32 which meshes into a pinion 33 rotatably mounted upon a stud 34 and fast to a gear 35 which is rotated by a worm 36 fast to a shaft 37, said shaft being rotated by a pulley 38.

The oven is heated by means of a series of burners 39, each of which is connected to a main supply pipe 40 and embodies a stop cock 41 which has a lever 42 fast thereto. The lever 42 has an arm 43 projecting downwardly therefrom which is connected to a link 44. The link 44 is connected to all of the stop cock arms of the different burners and is operated by means of a lever 45 pivoted to a bracket 46 fast to the floor and connected by a link 47 to said link 44. The lever 42 has a vertically extending arm 48 which, in turn, is connected by a link 49 to a sleeve 50 mounted to slide vertically upon the burner 39 to open and close ports 51 in said burner, whereby air is admitted to the burner to mix with the gas to produce a blue flame.

The base 12 is provided with an opening 52 which extends longitudinally thereof and is located beneath the reel 26 and in alinement with the burners 39.

A pair of vertical baffle plates 53 are located upon opposite sides of the burners 39 and project upwardly through the opening 52. Said baffle plates are supported at their opposite ends upon the frame of the machine and are spaced apart a less distance than the distance across said opening 52, so that there is a longitudinal opening 54 between said baffle plates and two longitudinal openings 55 and 56 on opposite sides of said baffle plates.

A deflector 57 is provided on the upper portion of the cover above the reel 26, which has longitudinally extending and upwardly diverging sides 58 and 59, so that as the heated air passes upwardly between the baffle plates 53 it is guided by said baffle plates in a vertical direction through the reel and upwardly against the deflector 57 where it is divided into two portions and said portions of said hot air are deflected and guided downwardly by the upper portion of the cover 16 and by the base 12 outwardly through the openings 55 and 56.

A flue 60 leads out of the top of the cover and the walls of said flue are formed to represent a knife blade 61 and a knife handle 62. In the handle 62 of the knife is located a damper 63. The upper end of said handle 62 terminates beneath a hood 64 which is connected by a pipe 65 to a blower 66.

Upon one side of the cover 16 is a window 67 and upon the other side is a door 68 pivoted at 69 to the cover 16 and provided with a window 70. Said cover has a handle 71 by means of which the same may be tipped upon its hinges. The sashes of the window 67 and of the window 70 are detachably fastened to the framework 72 of the window 67 and the framework 73 of the door 68, respectively.

A plurality of electric lamps 74 are mounted within the cover 16 adjacent to the window 67. These lamps are contained in an electric circuit having wires 75 and 76 which are connected to properly insulated contacts 77 and 78 supported upon one end of the base 12. One of the end portions of the reel 26 has a series of properly insulated contacts 79 mounted thereon which intermittently connect and disconnect the contacts 77 and 78 from each other and thus intermittently make and break the electric circuit in which is included the lamps 74, so that the interior of the oven is intermittently illuminated and rendered dark as the reel is rotated by the mechanism hereinbefore described.

The general operation of the device hereinbefore specifically described is as follows: Loaves of bread or other articles of bread to be baked are placed upon the shelves 30. The reel 26 is rotated by means of the gearing hereinbefore described. Heat is supplied from the burners 39 and said burners are operated to supply more or less gas thereto and more heat to the oven for baking the bread by the lever 45, link 44, link 47 and levers 42 which open and close the stop cocks 41 and supply more or less gas and air to the burners 39, as hereinbefore described. Access to the interior of the oven, in order that the bread may be placed upon the shelves and taken off of the shelves, is obtained by opening the door 68 by means of the handle 71 and tipping it downwardly upon its hinges 69.

When it is desired to have a portion of the air from the oven pass outwardly to the outside of the show window, the damper 63 is opened and the aroma from the cooking bread then passes upwardly through the knife blade 61 and handle 62 and is drawn by the blower 66 upwardly through the hood 64 and pipe 65 and wafted outwardly upon the street or sidewalk in the vicinity of the show window.

As the reel rotates, with the loaves of bread, biscuits or the like on the shelves, they pass by the window 67 and the contacts 79 on the reel intermittently make and break the circuit by means of engaging and disengaging alternately the contacts 77 and 78, so that light is flashed by the electric lamps 74 throughout the interior of the oven, illuminating the same and making the contents thereof clearly visible to persons looking through the show window and through the window 67 in the casing of the oven. Thus the attention of the passerby is attracted by the intermittent flashing of the light and by the smell of the bread to the display loaf of bread forming the casing of the oven and his interest directed to the loaves of bread passing by the window 67 and being cooked a delicate and tempting brown.

The parallelly arranged baffle plates 53 cause the heated air to be directed upwardly through the reel against the loaves on the shelves as they pass through the heated currents of air and said heated currents of air impinging against the deflector are caused to diverge along the inside of the top of the cover in opposite directions and then passing downwardly in the inside of the base 12 they pass outwardly through the openings 52. The chambers 9 at this point in the distribution of the heated air currents within the oven and the air spaces in the chambers 9 play an important part as they prevent the sudden cooling of the downwardly moving heated air currents within the oven and thus conduce to an even high temperature from the top throughout the entire interior of the oven.

In order to obtain access to the lower half or base portion of the oven as well as to the machinery, gearing, etc., for purposes of repair or cleaning the same, the cover is lifted bodily off of the base and removed therefrom whereupon easy and free access is obtained to the entire semi-cylindrical base of the oven and to the mechanism which operates the reel.

Having thus specifically described our invention what we claim and desire by Letters Patent to secure is:

1. A baker's oven having, in combination, a casing comprising a hollow semi-cylindrical base with vertical ends, and a hollow cover therefor separable therefrom and comprising a curvilinear upper portion and oppositely disposed side and end portions extending downwardly therefrom and inclosing said base.

2. A baker's oven having, in combination, a casing comprising a hollow semi-cylindrical base with vertical ends, a hollow cover therefor separable therefrom and comprising a curvilinear upper portion and oppositely disposed side and end portions extending downwardly therefrom and inclosing said base, a reel rotatably mounted within said casing and shelves pivotally mounted on said reel.

3. A baker's oven having, in combination, a casing comprising a hollow semi-cylindrical base with vertical ends, a hollow cover therefor separable therefrom and comprising a curvilinear upper portion and oppositely disposed side and end portions extending downwardly therefrom and inclosing said base, a reel rotatably mounted within said casing, shelves pivotally mounted on said reel, and mechanism inclosed within said casing adapted to impart a rotary motion to said reel.

4. A baker's oven having, in combination, a reel, a frame upon which said reel is rotatably mounted, shelves pivotally mounted on said reel and a hollow cover therefor separable from said frame and comprising a curvilinear upper portion and oppositely disposed side and end portions extending downwardly therefrom and inclosing said reel.

5. A baker's oven having, in combination, a frame, a reel rotatably mounted upon said frame, shelves pivotally mounted on said reel and a cover therefor separable from said frame and comprising a curvilinear upper portion and oppositely disposed side and end portions extending downwardly therefrom and inclosing said reel.

6. A baker's oven having, in combination, a frame, a reel rotatably mounted upon said frame, shelves pivotally mounted on said reel and a cover therefor comprising a curvilinear upper portion and oppositely disposed side and end portions extending downwardly therefrom and inclosing said reel, said cover consisting of a metal framework covered with plaster, stucco or the like.

7. A baker's oven having, in combination, a reel, a frame upon which said reel is rotatably mounted, shelves pivotally mounted on said reel, a hollow cover therefor separable from said frame and comprising a curvilinear upper portion and oppositely disposed side and end portions extending downwardly therefrom and inclosing said reel and a flange projecting laterally outward from the lower end of said cover.

8. A baker's oven having, in combination, a frame, a reel rotatably mounted upon said frame, shelves pivotally mounted on said reel, a cover therefor comprising a curvilinear upper portion and oppositely disposed side and end portions extending downwardly therefrom and inclosing said reel and a window in said cover extending longitudinally thereof.

9. A baker's oven having, in combination, a frame, a reel rotatably mounted upon said frame, shelves pivotally mounted on said reel, a cover therefor comprising a curvilinear upper portion and oppositely disposed side and end portions extending downwardly therefrom and inclosing said reel, a window in one side of said cover and a door in the opposite side of said cover extending longitudinally thereof and pivoted thereto.

10. A baker's oven having, in combination, a casing comprising a hollow semi-cylindrical base with vertical ends, a hollow cover therefor comprising a curvilinear upper portion and oppositely disposed side and end portions extending downwardly therefrom and inclosing said base and a pair of legs upon which said casing is supported, said legs projecting downwardly from said casing and below the bottom of said cover.

11. A baker's oven having, in combination, a casing, a reel rotatably mounted within said casing, a plurality of shelves pivoted to said reel, an opening extending longitudinally along the bottom of said casing, a series of burners located beneath said opening, and a pair of vertical baffle plates located upon opposite sides of said burners and extending upwardly through said longitudinal opening and beneath said reel.

12. A baker's oven having, in combination, a casing, a reel rotatably mounted within said casing, a plurality of shelves pivoted to said reel, an opening extending longitudinally along the bottom of said casing, a series of burners located beneath said opening, a pair of vertical baffle plates located on opposite sides of said burners and extending upwardly through said longitudinal opening and beneath said reel and a deflector located above said reel and having oppositely disposed sides extending longitudinally of said casing and diverging from each other upwardly from said reel.

13. A baker's oven having, in combination, a casing comprising a hollow semi-cylindrical base with vertical ends and a hollow cover therefor separable therefrom and comprising a curvilinear upper portion and oppositely disposed side and end portions extending downwardly therefrom and inclosing said base and a flue opening out of said cover and extending upwardly therefrom.

14. A baker's oven having, in combination, a casing comprising a hollow semi-cylindrical base with vertical ends and a hollow cover therefor separable therefrom and comprising a curvilinear upper portion and oppositely disposed side and end portions extending downwardly therefrom and inclosing said base, a flue opening out of said cover and extending upwardly therefrom and means to open and close said flue.

15. An advertising device having, in combination, a show window, a baker's oven therein, a casing for said oven formed to counterfeit a loaf of bread, a flue leading out of said casing and a blower connected to said flue and opening out of said show window, whereby the aroma from articles being cooked in said oven may be drawn from said oven and wafted into the atmosphere surrounding said show window.

16. An advertising device having, in combination, a show window, a baker's oven located in said show window, a casing for said oven formed to counterfeit a loaf of bread, a flue leading out of said casing and formed to counterfeit a carving knife and having a handle extending upwardly, a hood located above the upper end of said handle, a blower arranged adjacent to the front of said show window and opening outwardly therefrom and connected to said hood, whereby the aroma from articles being cooked in said oven is wafted outwardly from said blower in the vicinity of said show window.

17. An advertising device having, in combination, a show window, a baker's oven located in said show window, a pipe opening out of said show window, and a blower connected to said pipe, whereby the aroma from articles being cooked in said oven may be drawn from said oven and wafted into the atmosphere surrounding said show window.

18. An advertising device having, in combination, a show window, a baker's oven located in said show window, a casing for said oven formed to counterfeit a loaf of bread, a pipe leading out of said casing, and a blower connected to said pipe, whereby the aroma from articles being cooked in said oven may be forced through said pipe and wafted into the atmosphere surrounding said show window.

19. A baker's oven having, in combination, a casing, a rotary reel mounted within said casing, shelves pivotally mounted on said reel, a window in said casing, an electric lamp in said casing, an electric circuit connected to said lamp and means to intermittently make and break said circuit.

20. A baker's oven having, in combination, a casing, a rotary reel mounted within said casing, shelves pivotally mounted on said reel, a window in said casing, a lamp located within said casing, an electric circuit connected to said lamp and means operated by the rotation of said reel to make and break said circuit.

21. A baker's oven having, in combination, a casing, a rotary reel mounted within said casing, shelves pivotally mounted on said reel, a window in said casing, a lamp located within said casing, an electric circuit connected to said lamp, a pair of contacts in said electric circuit, a contact on said reel adapted to intermittently connect and disconnect said contacts whereby the interior of said oven may be intermittently lighted.

22. A show window, a baker's oven located within said show window, a reel rotatably mounted within said baker's oven, shelves pivotally mounted upon said reel, a casing for said baker's oven, a window in said casing extending longitudinally thereof, a flue one end thereof communicating with said oven, the other end thereof terminating adjacent to the front of said show window and outside thereof and means to force air from the interior of said oven through said flue.

23. A baker's oven having, in combination, a casing, a rotary reel mounted within said casing, shelves pivotally mounted on said reel, a window in said casing and means located within said casing adapted to illuminate the interior thereof.

24. A baker's oven having, in combination, a casing, a rotary reel mounted within said casing, shelves pivotally mounted on said reel, a window in said casing and means located within said casing adapted to intermittently illuminate the interior thereof.

25. A baker's oven having, in combination, a frame, a reel rotatably mounted upon said frame, shelves pivotally mounted on said reel and a cover therefor comprising a curvilinear upper portion and oppositely disposed side and end portions extending downwardly therefrom and inclosing said reel, said cover consisting of a framework of fireproof material covered with plaster, stucco or the like.

26. An advertising device having, in combination, a show window, a baker's oven located in said show window, said show window being provided with an opening, and a ventilating device adapted to draw air from the inside of the show window and dispense the same outside said show window, whereby the aroma from articles being cooked in said oven may be drawn from said show window and wafted into the atmosphere surrounding said show window.

27. An advertising device having, in combination, a show window, a baker's oven located in said show window, a hood located adjacent to said oven, a pipe leading from said hood out of said show window and a ventilating device connected to said pipe, whereby the aroma from articles being cooked in said oven may be drawn from said oven and wafted into the atmosphere surrounding said show window.

In testimony whereof we have hereunto set our hands in presence of two subscribing witnesses.

WALTER G. HOPKINS.
FRANCIS J. SULLIVAN.

Witnesses:
CHARLES S. GOODING,
FRANKLIN E. LOW.